United States Patent [19]

Tranter

[11] 4,269,587
[45] May 26, 1981

[54] COMPRESSION MOULDING PRESSES

[75] Inventor: Harold W. Tranter, Aldridge, England

[73] Assignee: British Industrial Plastics Limited, Great Britain

[21] Appl. No.: 110,037

[22] Filed: Jan. 7, 1980

[30] Foreign Application Priority Data

Jan. 12, 1979 [GB] United Kingdom ............... 1318/79

[51] Int. Cl.³ .......................................... B29C 1/00
[52] U.S. Cl. ............................... 425/451.9; 425/408; 425/409
[58] Field of Search ............... 425/214, 233, 236, 406, 425/407, 408, 409, 411, 451.9, 495

[56] References Cited

U.S. PATENT DOCUMENTS

| | | | |
|---|---|---|---|
| 2,497,044 | 2/1950 | Hess et al. | 425/409 X |
| 2,526,918 | 10/1950 | Wilberschied | 425/595 X |
| 2,821,747 | 2/1958 | Rossiter | 425/595 X |
| 3,142,093 | 7/1964 | Tribbett | 425/409 X |
| 3,199,159 | 8/1965 | Wernecke | 425/595 X |
| 3,316,593 | 5/1967 | Neumann | 425/411 X |
| 3,528,134 | 9/1970 | Fischback | 425/214 |
| 3,540,524 | 11/1970 | Bachelier | 425/595 X |
| 3,608,152 | 9/1971 | Fink et al. | 425/451.9 X |
| 3,981,671 | 9/1976 | Edwards | 425/408 X |
| 4,174,939 | 11/1979 | Fenner | 425/451.9 |

Primary Examiner—J. Howard Flint, Jr.
Attorney, Agent, or Firm—William A. Drucker

[57] ABSTRACT

An upstroking compression moulding press includes a pair of side frame members to support an upper, fixed platen which is pivotably supported between said members, said platen having locking means thereon comprising a bar extending over at least the thickness of both of said sideframe members and the distance between them, together with means for displacing said bar from a first position in which it is spaced from said members and a second position in which end portions of the bar are received in notches in said members.

9 Claims, 1 Drawing Figure

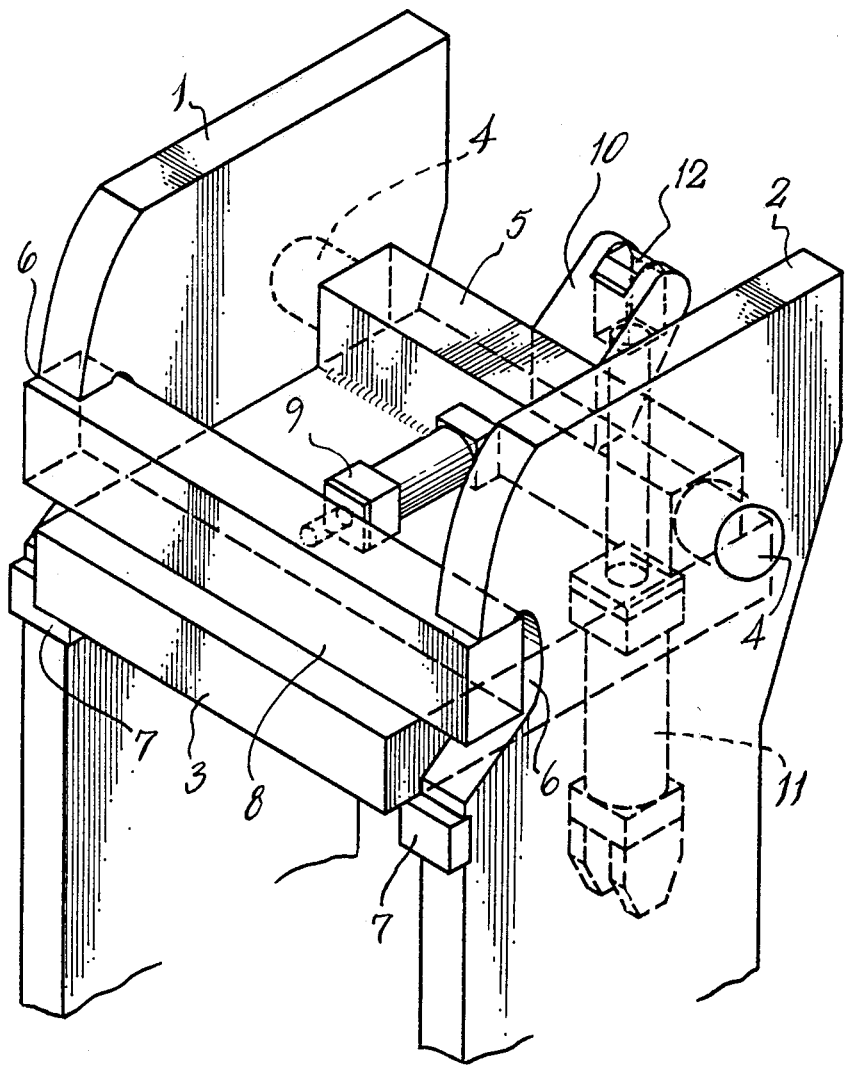

COMPRESSION MOULDING PRESSES

FIELD OF THE INVENTION

This invention relates to upstroking compression moulding presses. In particular, it relates to an upstroking press in which the upper, fixed platen can be tilted about one edge to facilitate access to a mould half mounted on it.

THE PRIOR ART

Upstroking presses are well-known, but the inclusion of a tilting upper platen presents considerable practical problems, since a locking mechanism must be fitted to retain the platen in the non-tilted attitude during pressing.

The locking mechanisms previously used have various disadvantages. For example, where the operating means for the locking mechanism also has to withstand the forces developed in pressing, it must be very heavily reinforced, far beyond that which would be appropriate simply to operate a locking mechanism. Even where this particularly difficulty is avoided, the forces due to pressing still have to be transferred through the platen, its hinges and the locking mechanism to the side frames of the press. Asymmetric distortion of the press side frames is potentially dangerous in that it may result in fatigue failure, as well as in difficulty in aligning the moulding tools. It is an object of the present invention to provide a simple locking mechanism which when in use operates to distribute the pressing stresses in a uniform and predictable manner such that press side frame distortion is minimised.

DESCRIPTION OF THE INVENTION

According to the present invention, an upstroking compression moulding press includes a pair of sideframe members to support an upper, fixed platen which is pivotably suppported between said members, said platen having locking means thereon comprising a bar extending over at least the thickness of both of said sideframe members and the distance between them, together with means for displacing said bar from a first position in which it is spaced from said members and a second position in which end portions of the bar are received in notches in said members.

Preferably the locking bar is mounted for sliding movement across that face of the platen remote from the moving platen of the press and the means for displacing the bar comprises a hydraulic or pneumatic cylinder mounted on the platen.

Preferably the sideframe members are provided with stops to accurately define that attitude of the platen wherein the end portions of the bar are to be received in the notches. The notches will normally be located to ensure that the platen is lockable in the position appropriate for pressing to take place, i.e. with the platen parallel to the moving platen of the press.

Preferably, the press is also provided with means whereby the platen can be tilted for access purposes. Preferred means for this are a hydraulic/pneumatic piston and cylinder device acting on the platen, for example through a bracket attached to the platen and projecting therefrom on the opposite side of the pivot to the platen proper.

DESCRIPTION OF A PREFERRED EMBODIMENT

A preferred embodiment of the invention will now be described by way of example with reference to the accompanying drawing in which the sole FIGURE is a perspective view of part of an upstroking compression moulding press in accordance with the invention.

The figure shows only the upper part of the press, the moving platen, main ram, the bedplate and control system being omitted in the interests of simplicity.

In the figure, a pair of heavy sideframe members 1, 2 have the fixed, tilting platen 3 of the press pivoted between them on pivots 4 extending from a pivot support block 5 welded to the upper face of the platen 3. The sideframe members each have a notch 6 and a stop 7, the latter serving to stop the platen in a substantially horizontal position, substantially parallel to the lower, moving platen (not shown) of the press. Although not shown in the figure, the two stops 7 are so disposed as to ensure that the platen stops in a position very slightly beyond the desired horizontal position, so that the operation of the locking mechanism does not cause excessive wear on the notches or the locking bar itself, or on both. The pressing operation brings the platen to its final, horizontal position, as will now be discussed.

Slidably mounted on the platen 3 is a locking bar 8; a hydraulic piston and cylinder 9 connected between the block 5 and the bar is provided to displace the bar towards and away from the sideframe members, into and out of the notches 6. A bracket 10 is mounted on the block 5 so as to project on the opposite side of the pivots 4 to the major portion of the platen 3. A second hydraulic piston and cylinder 11 is connected between a pivot 12 on the bracket 10 and a fixed frame member (not shown) extending between the sideframe members, but outside the pressing area.

In operation when the press is being used for compression moulding an article, the tilting platen is firmly locked in the horizontal attitude shown in the FIGURE by the bar 8. The stops 7 serve only to locate the platen relative to the notches, so that the locking bar can be moved into the notches without undue frictional wear occurring. Because the bar and its end portions extend over the full width of the platen, plus the full thickness of both sideframe members, the reaction developed in pressing is purely vertical, against the material of the sideframe above the notches. There is no side thrust which would tend to distort the sideframe members. The absence of side thrust means that it is not necessary to provide a reinforced press head to maintain parallelism in the sideframes. In between pressing operations, the locking bar 8 can be displaced from the notches 6 and the piston and cylinder 11 actuated to tilt the platen 3, thereby facilitating access to the underside of the platen and more particularly, to the half of a moulding tool mounted thereon.

I claim:

1. An upstroking compression moulding press including a pair of side frame members to support an upper, fixed platen which is pivotably supported between said members, said platen having locking means thereon comprising a locking bar extending over at least the thickness of both of said sideframe members and the distance between them, together with means for displacing said bar from a first position in which it is spaced from said members and a second position in which end portions of the bar are received in notches in said members.

2. The press of claim 1 wherein the locking bar is mounted for sliding movement across that face of the platen remote from the moving platen of the press and the means for displacing the bar comprises a hydraulic or pneumatic cylinder mounted on the platen and operably connected to said bar.

3. A press according to claim 1 or claim 2 wherein said sideframe members are provided with stops to accurately define that attitude of the platen wherein the end portions of the bar are to be received in the notches.

4. A press according to claim 1 provided with means whereby the platen can be tilted for access purposes, wherein said means for tilting the platen is a hydraulic/pneumatic piston and cylinder device acting on the platen through a bracket attached to the platen, said bracket projecting therefrom on the opposite side of the pivot to the platen proper.

5. In an upstroking compression moulding press of the kind including a pair of side frame members to support an upper, fixed platen which is pivotably supported between said members, said platen having locking means thereon operable to lock said platen in a pressing attitude, the improvement wherein said locking means comprises a locking bar extending over at least the thickness of both of said sideframe members and the distance between them, together with means for displacing said bar from a first position in which it is spaced from said members and a second position in which end portions of the bar are received in notches in said members.

6. The press of claim 5, wherein said locking bar is mounted for sliding movement across that face of the platen remote from the moving platen of the press and the means for displacing the bar comprises a hydraulic or pneumatic cylinder mounted on the platen.

7. The press of claim 5 or claim 6 wherein the sideframe members are provided with stops to accurately define that attitude of the platen wherein the end portions of the bar are to be received in the notches.

8. The press of claim 5 provided with means whereby the platen can be tilted for access purposes, wherein the means for tilting the platen is a hydraulic/pneumatic piston and cylinder device acting on the platen through a bracket attached to the platen, said bracket projecting therefrom on the opposite side of the pivot to the platen proper.

9. In an upstroking compression moulding press of the kind including a pair of side frame members to support an upper, fixed platen which is pivotably supported between said members, said platen having locking means thereon operable to lock said platen in a pressing attitude, the improvement wherein said locking means comprises a locking bar mounted for sliding movement across that face of the platen remote from the moving platen of the press and extending over at least the thickness of both of said sideframe members and the distance between them, a hydraulic or pneumatic cylinder mounted on the platen and operable to displace said bar from a first position in which it is spaced from said members and a second position in which end portions of the bar are received in notches in said members, together with stops on said sideframe members operable to accurately define that attitude of the platen wherein the end portions of the bar are to be received in the notches, said stops being so located relative to said notches that displacement of the locking bar into said notches takes place under conditions whereby there is minimal frictional engagement between said bar and said notches.

* * * * *